Patented May 9, 1933

1,908,176

UNITED STATES PATENT OFFICE

ARNOLD E. OSTERBERG, OF ROCHESTER, MINNESOTA, ASSIGNOR TO THE CHEMICAL FOUNDATION, INCORPORATED, OF NEW YORK, N. Y.

PROCESS OF MAKING A PURIFIED COAL TAR OINTMENT

No Drawing.      Application filed May 28, 1929. Serial No. 366,765.

The object of my invention is the production of a purified coal-tar ointment for the treatment of acute and subacute eczemas and particularly infantile eczemas.

The use of crude coal tar in the treatment of eczematous inflammations of the skin, more particularly in cases of infantile eczema, has been found efficacious in affording prompt and striking relief and has been widely adopted by specialists in dermatology. The use of crude coal tar in such cases has two notable objections: first, the tendency to cause folliculitis on the skin; and, second, its undesirable properties of stickiness and staining.

My invention or discovery consists in the identification and isolation of the therapeutically active principle present in the crude tar and in the separation of this active ingredient from the crude material and its extraction as a clean and efficient preparation free from the objectionable characteristics inherent in its use in the crude form.

As is well known, crude coal tar is a highly complex and variable mixture of many organic compounds. By the present process, I separate the crude coal tar into two fractions by distillation, as follows:

One liter of the crude coal tar is placed in a three-liter distilling flask and distilled by passing through the hot solution a rapid stream of steam until no more oil appears in the distillate. I discard the fraction consisting of black, viscous residual pitch and take the other fraction which is volatile with steam at about 100° C. at atmospheric pressure. This product I redistill in the presence of steam to insure the removal of any contaminating residual pitch which may have been carried over mechanically during the first distillation. The product is a volatile semi-solid ether-soluble oil which is next extracted with any immiscible organic solvent capable of dissolving ether-soluble substances and preferably with ethyl-ether. The ether-soluble product resultant is then filtered through dry filter paper. The ether is removed by distillation and filtration, leaving a heterogenous residue free from the residual tarry pitch, and containing various hydrocarbon and cresolic and phenolic substances. By fractionation with heat or steam-distillation from an alkaline solution, this residue may be further refined and purified, as these hydrocarbons and phenolic and like substances may be separated and extracted by suitable solvents, but for practical use, the ether-soluble product is sufficiently purified to be free from the objectionable features attendant the use of crude coal tar and without loss or diminution of its therapeutic properties when diluted in various strengths and mixed with substances commonly used in ointment preparations for cutaneous inflammations, such as zinc oxide, petrolatum and starch. As an example of such a composition, and that which I have found to be most efficacious for infantile eczema, I take, by weight:

Of the above-described

| | Parts |
|---|---|
| Ether-soluble tar distillate | 3 |
| Pulverized zinc oxide | 30 |
| Starch | 50 |
| Yellow petrolatum | 120 |

It is found important to mix the distillate thoroughly before adding to it the other ingredients and to incorporate it evenly with the ointment vehicle.

As the therapeutic principle which I have described is a fraction and not an entity, it is difficult to specify its constants with exactness. The product is a semi-solid, oily, yellow-colored, ether-soluble phenolic and hydrocarbon substance, volatile at a temperature lower than 200° C. and capable of distillation with steam at 100° C. at atmospheric pressure.

In the foregoing description where I have specified the primary distillation by passing through the hot solution of crude coal tar a rapid stream of steam until no more oil appears in the distillate, I wish it to be understood that such specification of the use of steam is of the method which I have practiced preferentially; but that such distillation may be effected by heat from any other source, as by dry distillation, the effective temperature being kept below 200° C., since this effective temperature will remove by volatilization the substances desired, with boiling points up to 200° C. I wish it also understood that where I have specified that the fraction obtained from such primary distillation is to be redistilled in the presence of steam, that such fraction, with boiling points up to 200° C., is redistilled in the presence of steam at a temperature of approximately 100° C. at atmospheric pressure.

Having thus described my invention, I claim:

1. In the process of isolation and purification of the therapeutically active principle present in crude coal tar, the steps consisting in rapidly passing steam at atmospheric pressure through a hot solution of said tar at a temperature approximating but below 200° C. until no more oil appears in the distillate; separating the resultant fraction which is steam-volatile from the viscous residual pitch; redistilling said volatile fraction in the presence of steam at atmospheric pressure and at a temperature approximating 100° C.; removing the ether-soluble components from the resultant distillate by extraction; filtering the resultant extract; and removing the solvent by distillation and filtration.

2. In the process of isolation and purification of the therapeutically active principle present in crude coal tar, the steps consisting in rapidly passing steam at atmospheric pressure through a hot solution of said tar until no more oil appears in the distillate; separating the resultant fraction which is steam-volatile from the viscous residual pitch; redistilling said volatile fraction in the presence of steam; removing the ether-soluble components from the resultant distillate by extraction; filtering the resultant extract; removing the solvent by distillation and filtration, and refining the filtrate by fractionation with heat and extraction of the hydrocarbons and phenolic substances.

3. In the process of identification, isolation and purification of the therapeutically active principle present in crude coal tar, the steps consisting in the redistillation, at a temperature approximating 100° C. and in the presence of steam at atmospheric pressure, of the steam-volatile fraction of a crude coal tar distillate until any traces of residual pitch present therein are removed, leaving a volatile semi-solid oil; extracting the ether-soluble ingredients therefrom; filtering the product; and removing the solvent by distillation and by filtration, whereby a residual is obtained containing benzene hydrocarbons and cresolic and phenolic substances free from the undesired properties characterizing tarry pitch.

4. In the isolation of the particular therapeutic principles useful in the treatment of skin diseases, from crude coal-tar, the process consisting in the following steps: separating the crude coal-tar into two fractions by distillation; discarding the fraction consisting of black viscous residual pitch; redistilling the other fraction with steam, until no more oil appears in the distillate; subjecting this distillate consisting of a steam-volatile, semi-solid, ether-soluble oil to the action of an immiscible organic solvent capable of dissolving ether-soluble substances; filtering the resultant solution of said oil through dry filter paper to obtain a filtrate comprising a heterogenous residue containing the desired hydrocarbon and phenolic substances; distilling this residue to remove the solvent and any residual tarry pitch; and filtering the resultant distillate further to purify the therapeutic principle and to remove any remaining traces of the solvent.

5. In the isolation from crude coal-tar of the particular therapeutic principle useful in the treatment of skin diseases, the process consisting in the following steps: separating crude coal-tar into two fractions by distillation until no more oil appears in the distillate; discarding the fraction consisting of black, viscous residual pitch; redistilling the oily fraction in the presence of steam to produce a volatile, semi-solid, ether-soluble oil; extracting said oil with ether to obtain a purified product containing ether-soluble phenolic and hydrocarbon substances substantially free from tarry pitch; dry-filtering the resultant ether-soluble extract to produce a pitch-free filtrate; distilling said filtrate to produce a substantially ether-free distillate; and refiltering said distillate further to isolate the therapeutic principle, the product being a semi-solid, oily, yellow-colored, ether-soluble, phenolic and hydrocarbon substance, volatile at a temperature lower than 200° C. and capable of distillation with steam at 100° C. at atmospheric pressure.

6. The process for the isolation of the particular therapeutic principle from crude coal-tar, useful in the treatment of skin diseases, consisting in passing a rapid stream of steam through a hot solution of crude coal-tar until no more oil appears in the distillate; redistilling the oily distillate in the presence of steam to insure the removal of any residual pitch which may have been carried over mechanically during the first distillation, the product being a semi-solid, volatile oil containing ether-soluble phenolic and hydrocarbon substances; extracting said semi-solid oil with ether and filtering the extract to obtain the fraction consisting of phenolic and hydrocarbon substances; and redistilling said fraction to remove the ether therefrom, the product being a semi-solid, oily, yellow-colored, ether-soluble, phenolic and hydrocarbon substance, volatile at a temperature lower than 200° C. and capable of distillation with steam at 100° C at atmospheric pressure.

7. The process of isolation of its therapeutic principle useful in the treatment of skin diseases from crude coal-tar, consisting in separating from said tar by distillation a fraction, the boiling point of whose components is below 200° C., said fraction appearing as an oily distillate, and continuing such distillation until no more oil appears therein; redistilling said distillate in the presence of steam, the product being a semi-solid oil free from residual pitch; extracting said oil with ether, and filtering the extract, the filtrate consisting of an ether-soluble residue containing phenolic and hydrocarbon substances; and removing the ether from said filtrate by redistillation; the product being a semi-solid, oily, ether-soluble substance, capable of distillation with steam at atmospheric pressure at 100° C.

ARNOLD E. OSTERBERG.